(12) United States Patent
Kikkers (10) Patent No.: US 6,678,691 B1
(45) Date of Patent: Jan. 13, 2004

(54) METHOD AND SYSTEM FOR GENERATING CORPORATE INFORMATION

(75) Inventor: Harald Kikkers, Loppersum (NL)

(73) Assignee: Koninklijke KPN N.V., Groningen (NL)

( * ) Notice: Subject to any disclaimer, the term of this patent is extended or adjusted under 35 U.S.C. 154(b) by 0 days.

(21) Appl. No.: 09/530,154

(22) PCT Filed: Nov. 6, 1998

(86) PCT No.: PCT/EP98/07210

§ 371 (c)(1),
(2), (4) Date: Jul. 3, 2000

(87) PCT Pub. No.: WO99/24925

PCT Pub. Date: May 20, 1999

(30) Foreign Application Priority Data

Nov. 6, 1997 (NL) ............................................. 1007462

(51) Int. Cl.[7] ............................................. G06F 17/00
(52) U.S. Cl. ........................ 707/102; 707/100; 707/200
(58) Field of Search .................... 707/1–206; 710/7–21; 705/9–401

(56) References Cited

U.S. PATENT DOCUMENTS

| | | | | |
|---|---|---|---|---|
| 5,692,107 A | | 11/1997 | Simoudis et al. ............. 395/50 |
| 5,765,028 A | * | 6/1998 | Gladden ....................... 707/10 |
| 5,794,228 A | * | 8/1998 | French et al. .................. 707/2 |
| 5,832,475 A | * | 11/1998 | Agrawal et al. ............... 707/3 |

OTHER PUBLICATIONS

Salka, Abstract, Ending the ROLAP/MOLAP debate: usage based aggregation and flexible HOLAP, Data Engineering, 1998, Proceedings, 14th International Conference on, Feb. 23–27, 1998, p. 180.*

Jensene et al., Specifying OLAP cubes on XML data, Scientific and Statistical Database Management, 2001, SSDBM 2001, Proceedings, Thirteenth International Conference on, Jul. 18–20, 2001, pp. 101–112.*

Fidalgo et al., Providing OLAP interoperability with OLAP-Ware, Computer Science Society, 2002, Proceedings, 12th International Conference of the Chilean, Nov. 6–8, 2002, pp. 167–176.*

Cheng et al., "Transforming corporate information into value through data warehousing and data mining", 48th FID Conference and Congress, Globalization of Information. The Networking Information Society, Proceedings of 48th Conference of the Internationa.*

Paul S. Cheng et al, "Transforming corporate information into value through data warehousing and data mining", Aslib Proceedings, vol. 50, No. 5, May 1998, pps. 109–113.

Wayne W. Eckerson, "The Case for the Datamart", Database & Network Journal, vol. 27, No. 5, pps. 10–12.

Munindar P. Singh et al "The Carnot Heterogeneous Database Project: Implemented Applications", Distributed and Parallel Databases, Apr. 1997, Kluwer Academic Publishers, Netherlands, vol. 5, No. 2, pps. 207–225.

* cited by examiner

Primary Examiner—David Jung
(74) Attorney, Agent, or Firm—Michaelson & Associates; Peter L. Michaelson; George Wolken, Jr.

(57) ABSTRACT

System for the transformation of a number of source databases having n legacy data models to a target database having one target model, for the purpose of providing corporate information, such as customer information with integrated customer images. Use is made of a merge database, having an intermediate data structure with which the source database is coupled to the target database. The merge database has a number of structure elements on which four basic operations are performed, namely PROJECTING: filling the table of the merge database from the source database, GROUPING: determining the target-object-id of the object to which the record belongs, RELATING: determining the target-object-id of a related datum within the merge database, and CALCULATING: evaluation of an attribute of one table of the merge database. In this regard, the structure elements are read and changed by one of said basic operations according to a given processing matrix.

1 Claim, 7 Drawing Sheets

METHOD AND SYSTEM FOR GENERATING CORPORATE INFORMATION

BACKGROUND OF THE INVENTION

The invention is related to a system for generating corporate information, such as customer information etc.

A large organisation usually has many automation systems which contain information on partly the same objects, for example customers. In this regard there is a user group within the organisation which requires customer information originating from various systems and which is displayed as originating from one source. These users, in other words, require an integrated customer image.

It is obvious that the data model behind this integrated customer image should be based on the corporate data model. This data model, after all, offers an unequivocal frame of concepts which can be assumed to be known throughout the company. The data model on which this corporate data model is based is further designated as the target model.

The following requirements can be set regarding the target model:
Each object has a meaningless key, which, once assigned to an object, always retains the same value;
  herewith, each object always has an unequivocal identification throughout time, which is important for the following reasons:
    the keys are independent of implementation details in the legacy systems;
    it is possible to store information on an object and to save this information;
    trends for an object or for a group of objects can be followed;
Simple derivability of records from the legacy data to objects in the target model and vice versa; this is important for the following reasons:
  the transformation of legacy data into target data is testable;
  quality monitoring is possible;
  condition for possible implementation of update functions, in which commands which are given in terms of the corporate model are translated into a sequence of actions at the level of the legacy systems. The target model shall have to fed from the legacy systems. A possible technical solution for filling the target model is one in which the legacy systems are directly "pricked into" by means of RPC (Remote Procedure Calls).
Problems in this regard are:
  relationships on legacy systems are often difficult to establish due to incompatible codings etc.;
    the load on the legacy stems can be considerable since retrieving data may require intensive processing;
    the legacy stems need to be adapted;
    OLAP (Online Analytical Processing) on the target model is not possible.

The present invention now fulfils the need for a system providing an integrated corporate information image and therefore provides a system for generating corporate information such as customer information and the like and providing said corporate information to system users, said corporate information originating from various automation systems which contain information on partly the same objects and being displayed as originating from one source thus providing an integrated image, said system comprising means for transforming the contents of a plurality of source databases, each of them being loaded with legacy data records which are modelled according to a data model specific for that source database, to a target database having its own specific target data model, based upon the corporate data model, and said system comprising an intermediate merge database, including control means, between said source databases and said target database, said merge database having an intermediate data structure, and being filled with data from said source database, while said data are re-grouped and re-structured according to said intermediate data structure; said target database being filled from said merge database with said re-grouped and re-structured data, according to said target data model, said target model being enabled to extract data by said system users via user front-end applications;

said intermediate data structure of said merge database comprising following structure elements:
  a source identification (BI), indicating the origin of data records within the source database,
  a source reference (BR), indicating the origin of related data items in the source database,
  a target object identifier (TI), indicating a target object for each of said data record,
  a target object reference (TR) indicating a target object for each of said related data items,
  a status identifier (ST), indicating if data is current, and
  grouping attributes (GA), indicating fields into which data records can be divided in the case of a target object, and relational attributes (RA), indicating fields with which data records are related to a target object-identifier within the merge database;
said transformation, by means of said merge database, comprising following basic operations:
  a PROJECTION operation, consisting of filling the table of the merge database from the source database and thereby changing said source identification (BI), said source reference (BR), said status identifier (ST), and said attributes (GA, RA), by said merge database, in conformity to the different data models of the respective databases;
  a GROUPING operation, consisting of determining the target object identifier of each data record and thereby changing said target object identifier (TI) and reading said status identifier (ST) and said grouping attribute;
  a RELATING operation, consisting of determining the target object identifier of each related data item and thereby reading said target object identifier (TI), said status identifier and said relational attribute (RA), while changing said target object reference (TR).
  and optionally a CALCULATING operation, consisting of an evaluation of each attribute of a table of the merge database.

SUMMARY OF THE INVENTION

In the solution according to the invention, use is made of dumps of the legacy systems. In this regard, the global structure of the process which takes care of the transformation of legacy data models to a target model is represented by the following table, which, per data set, indicates the content of said data set and the processes acting on said data.

| DATA SET | CONTENT | PROCESSES |
|---|---|---|
| source database | copies of all relevant information of the legacy systems | load legacy data |
| merge database | intermediate data structure by which the source database is coupled to the target database | fill from the source database (projection) grouping relating calculating attributes |
| target database | implementation of the target model | selecting out to datamarts |
| datamarts | subset of the target model, composed for a specific purpose | is accessed by front-end applications |

Each table in the target database has its counterpart in a so-called merge database, from which it can be derived. In the target database, a complete and unequivocal image of an object is stored. In the merge database, all information on said object which is present in the source data is placed before that same object. The individual sources can each provide a fragmentary and mutually conflicting image of the object. The core of the transformer is the merge database.

The merge database has a generic structure through which the above-mentioned requirements of the target model can be met. According to the present invention, the merge database has the following structure elements:

| | | |
|---|---|---|
| BI | SOURCE IDENTIFICATION (" BRONIDENTIFICATIE" ) | origin within source at record level |
| BR | SOURCE REFERENCE(S) (" BRONREFERENTIE(S)" ) | origin of related data from the same source at record level |
| TI | TARGET-OBJECT-ID | identification of the target object |
| TR | TARGET-OBJECT-REFERENCE(S) | target-object-id of related data within the merge database |
| ST | STATUS | current/non-current datum |
| GA | GROUPING ATTRIBUTES | fields into which records can be divided in the case of a target object |
| RA | RELATIONAL ATTRIBUTES | fields with which records are related to a target-object-id within the merge database |
| OA | OTHER ATTRIBUTES | other fields which can be of importance for the target model |

Four basic operations are defined on the above structure:

PROJECTION: filling of the table of the merge database from the source database;

GROUPING: determining the target-object-id of the object to which the record belongs;

RELATING: determining the target-object-id of a related datum within the merge database;

CALCULATING: evaluation of the attribute of a table of the merge database.

The following table indicates which structure elements are read and changed by one of the basic operations. The basic operation "calculating" is diverse in nature and is not unequivocally representable in the table.

| STRUCTURE ELEMENT BASIC OPERATION | BI | BR | TI | TR | ST | GA | RA | OA |
|---|---|---|---|---|---|---|---|---|
| PROJECTION | chg | chg | | | chg | chg | chg | chg |
| GROUPING | | | chg | | read | read | | |
| RELATING | | read | | chg | read | | read | |

Note: The basic operation RELATING reads from two tables and changes one table.

EXAMPLE OF EMBODIMENT

The following practical example demonstrates how, in a target database, a customer image is built up with regard to failures and complaints. Said customer image is built up from the source database of the failures system and the source database of the complaints system. The practical example makes clear how the structure elements and the basic operations of the merge database can be deployed.

Figure 1:
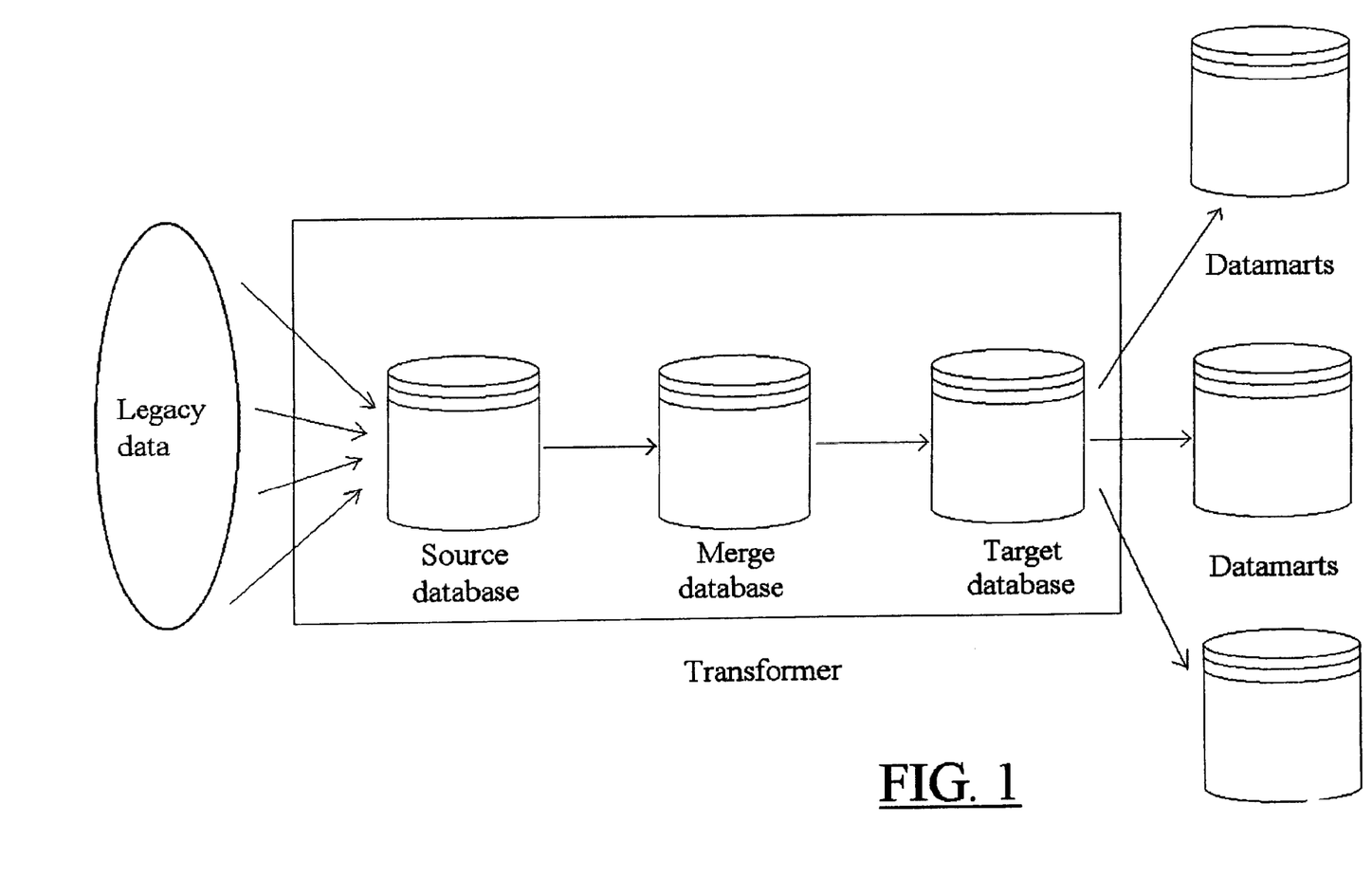
FIG. 1 shows the overall set-up of the transformation process.
Figure 2:
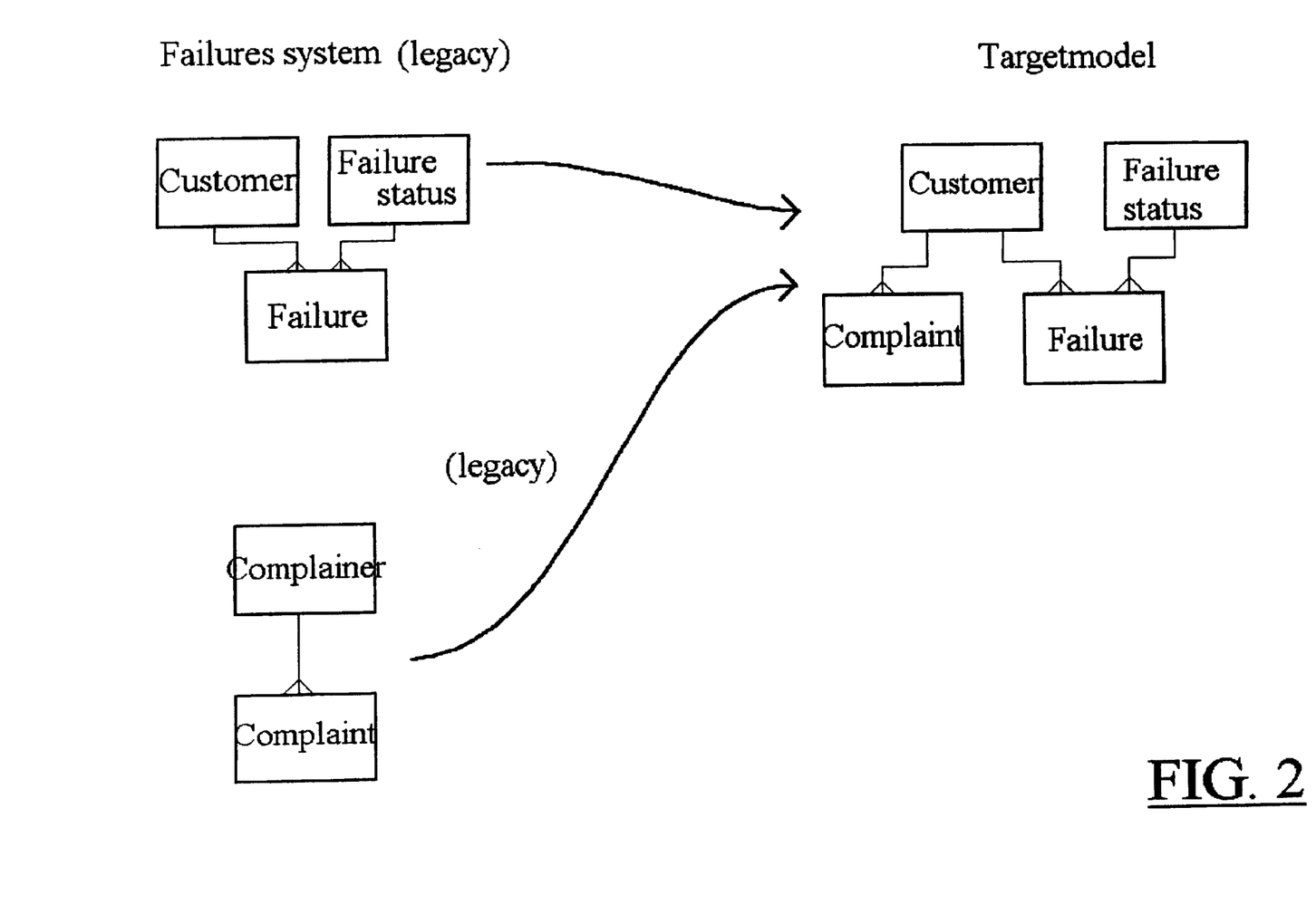
FIG. 2 shows the structure of the customer image based on the failures database and the complaints database.
Figure 3:
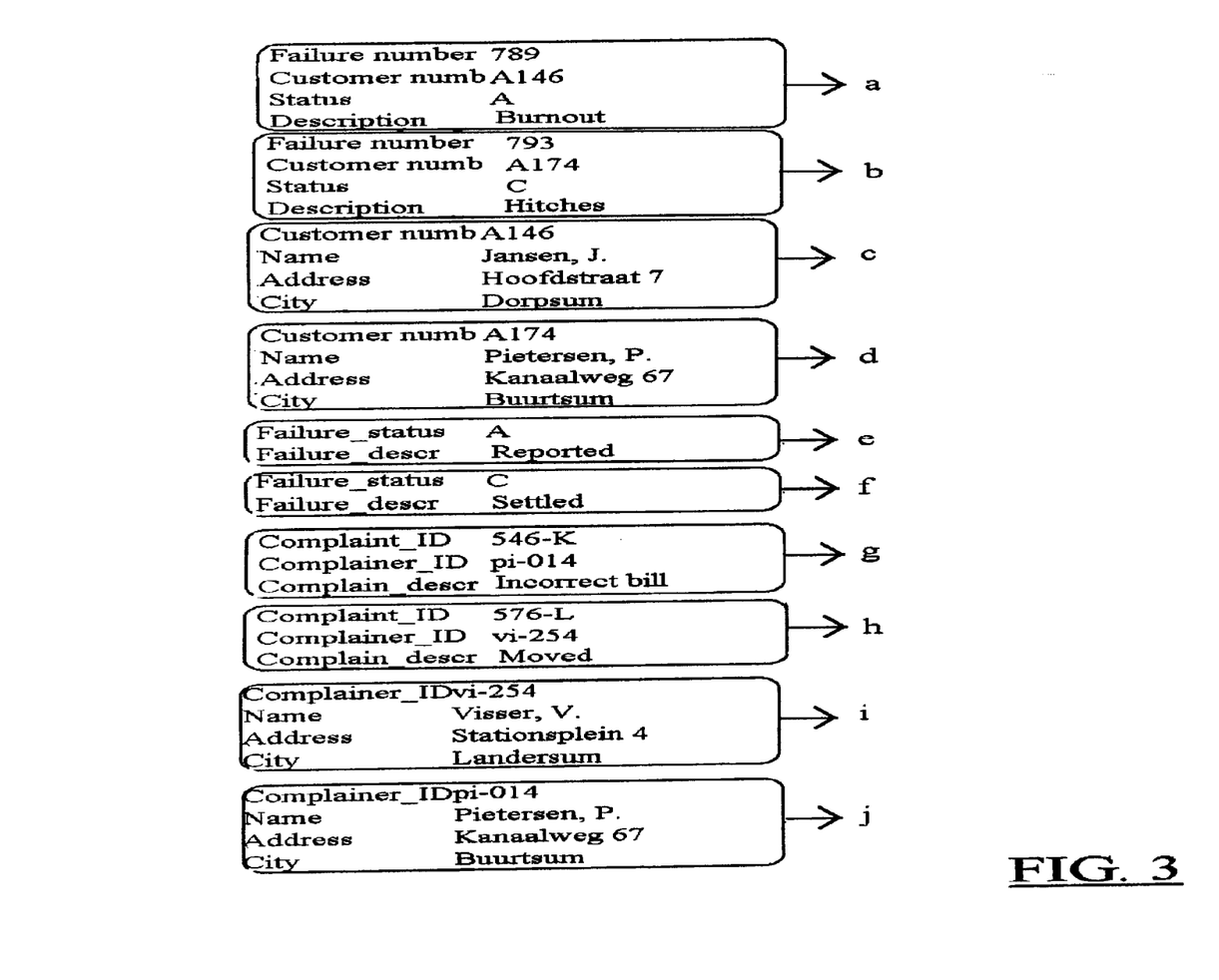
FIG. 3 shows the content of the source database.
Figure 4:
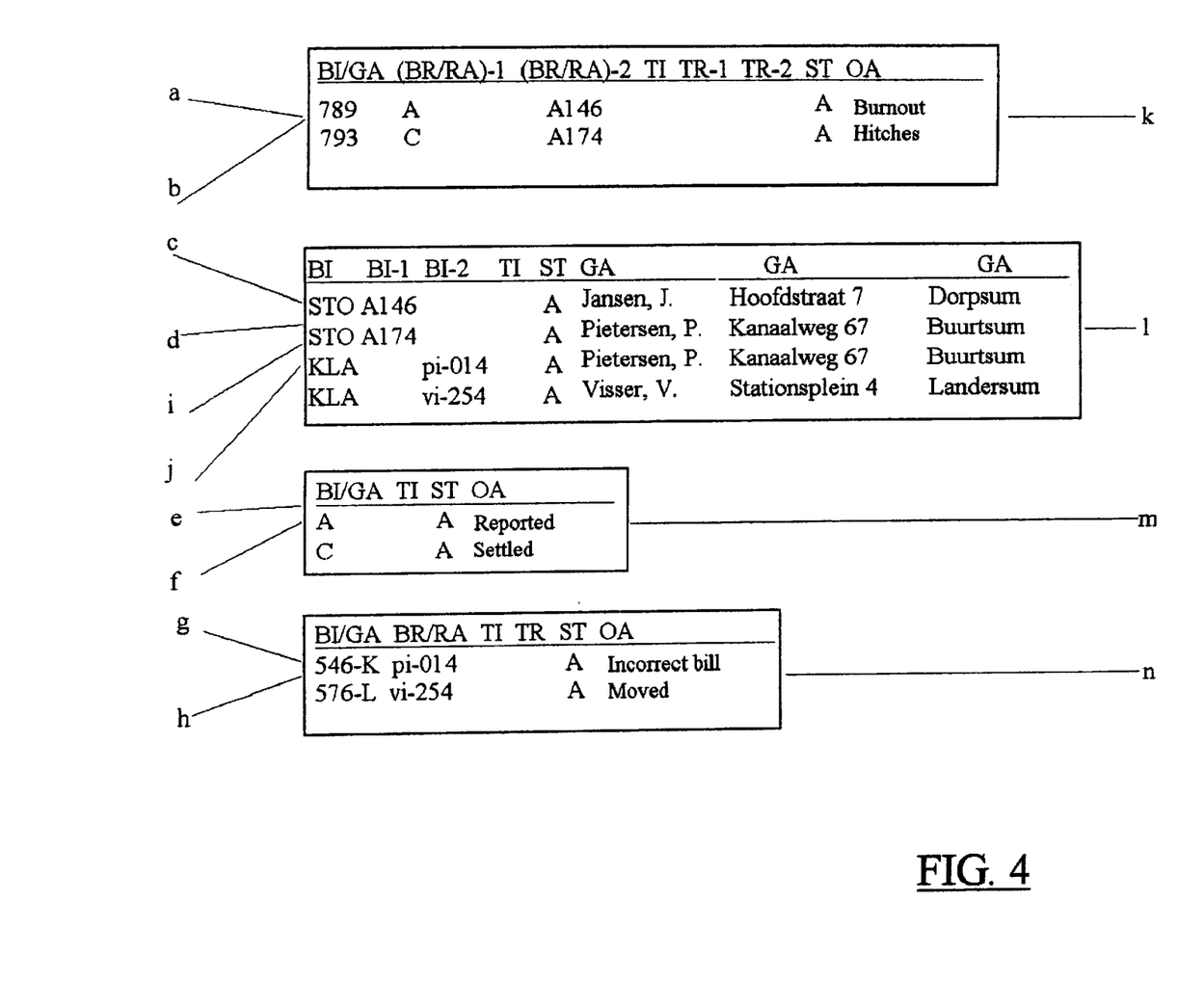
FIG. 4 shows the merge database, after the basic operation PROJECTION.

The projection maps the source database (FIG. 3) on the merge database (FIG. 4). For records which are no longer current, the structure element status is set to "non-current". It is evident from the example that:

not every structure element needs to occur in every table;

a structure element can be implemented in several fields;

a field can cover several structure elements.

Figure 5:
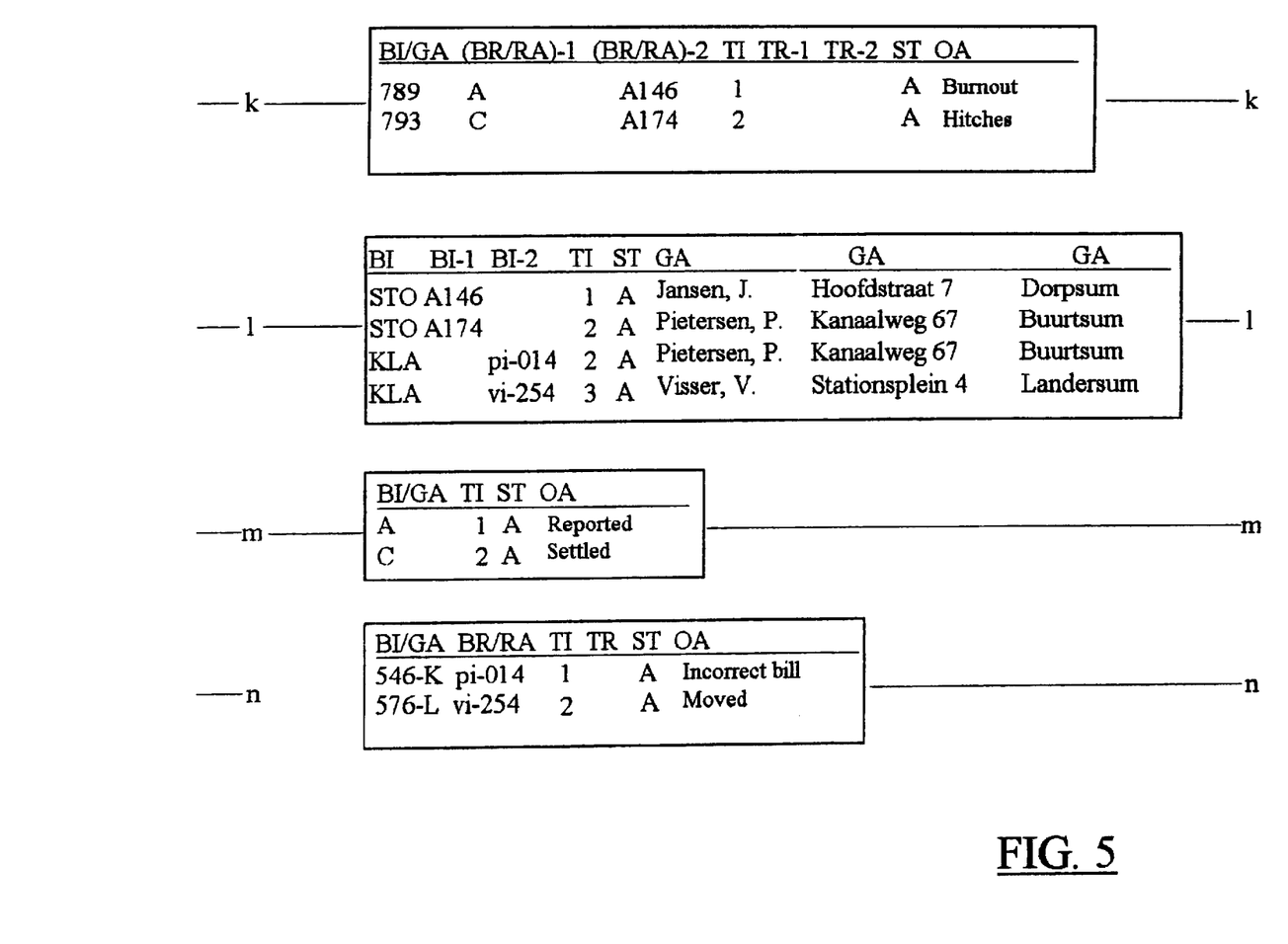
FIG. 5 shows the merge database, after the basic operation GROUPING.
Figure 6:
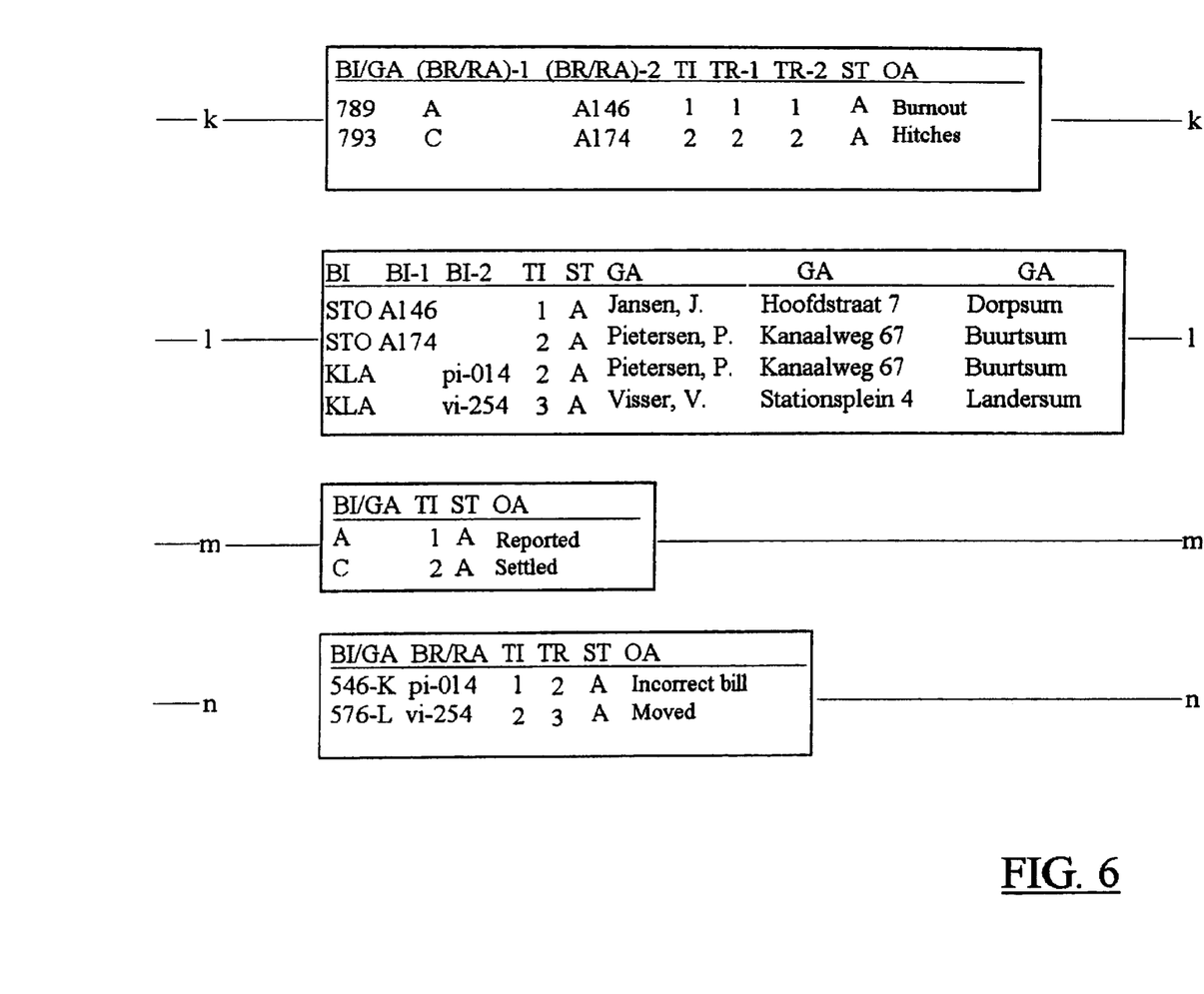
FIG. 6 shows the merge database, after the basic operation RELATING.
Figure 7:
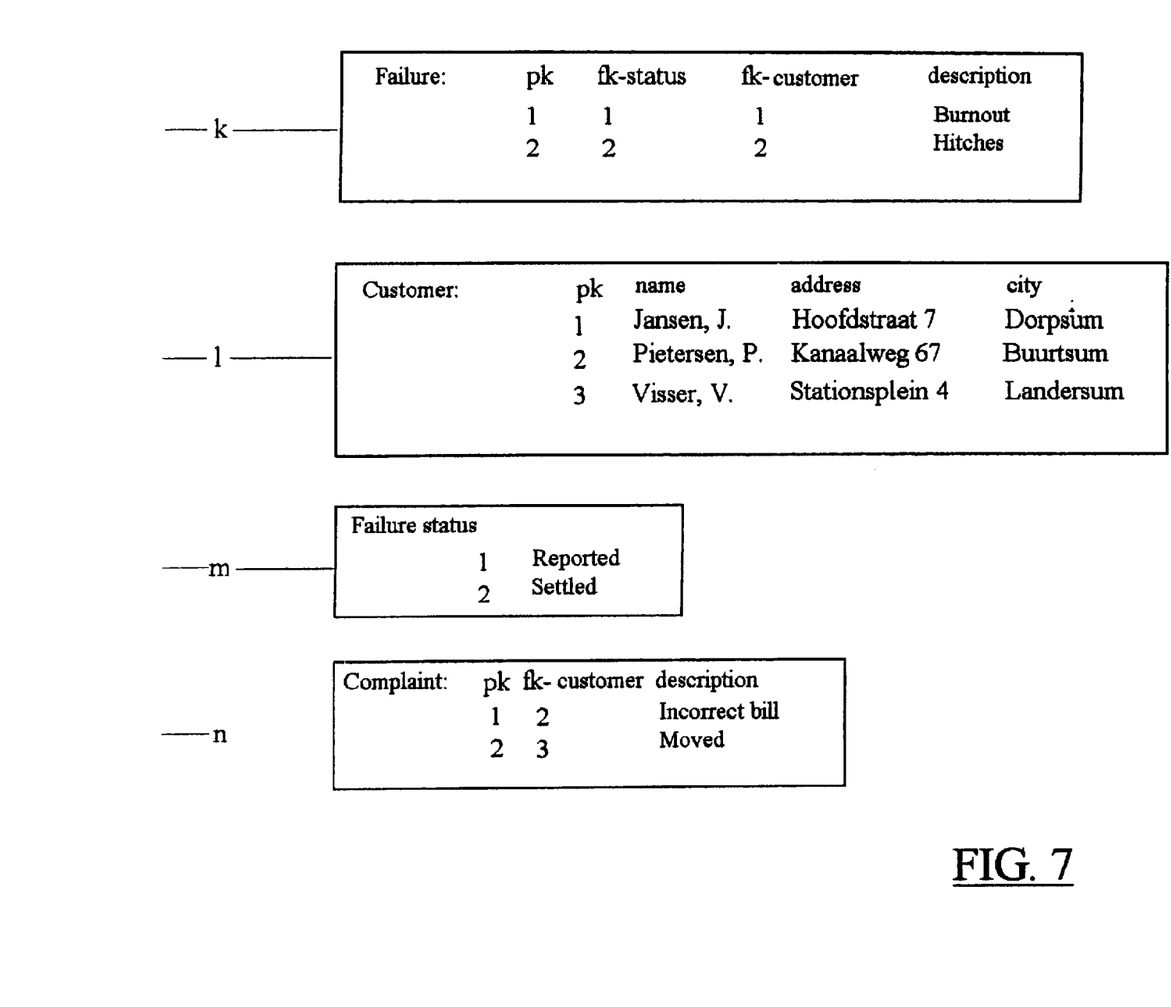
FIG. 7, finally, shows the content of the target database.

The grouping indicates to which object the information of the record belongs; grouping takes place by filling in the structure element (a meaningless object key) TARGET-OBJECT-ID (FIG. 5). Records receive the same TARGET-OBJECT-ID if the grouping criteria for the records are equal. In the example, the grouping criterion is always that the grouping attributes must contain equal values. A part of a grouping criterion can also be that certain grouping attributes must contain a constant value. Besides records having the status 'current', the grouping also takes records with the status 'non-current' into consideration. Hereby objects which undergo a change and objects which, after a time of absence (status 'non-current'), return again (status 'current'), retain the same value for the structure element target-object-id. The relating (FIG. 6) is a similar process as the grouping: in a grouping, a table is related to itself and in a relating operation two tables are taken into consideration. Relating operations always take only records having the status 'current' into consideration.

In the example, the basic operation "calculating" is not carried out. An example for a calculation could be that the name, address and place of residence data of a customer are cosmeticised, after which the cosmeticised value is used as grouping attribute. This can prevent a customer whose name, address and place of residence data are spelt slightly different in two legacy systems, from being presented in the target database as two customers.

With this structure, the requirements which were set can satisfied:

meaningless key for each object of the target model; the key value is retained in the course of time;

simple derivability of objects from the target model: the target-object-id in the merge database points to the object with the same key in the target database, and the source identification of a record in the merge database points to one record in a legacy system.

The derivability is thus laid down in the data, and an analysis of the transformation process therefore does not need to take place.

It is observed that the system according to the invention has a number of characteristics of a data warehouse. A data warehouse system, however, collects legacy data, merges the data of the legacy systems and makes the data available. The system according to the invention is controlled on the basis of the design of the corporate model. The transformations are therefore much more extensive. Further, data warehouses are used only for OLAP purposes. The system according to the invention is used for OLAP purposes as well as for filing purposes. This places greater demands on the quality and refreshment time of the data. Matters such as persistence of object keys and derivability of objects are not necessary for a data warehouse.

What is claimed is:

1. A system for generating corporate information such as customer information and the like and providing said corporate information to system users, said corporate information originating from various automation systems which contain information on partly the same objects and being displayed as originating from one source thus providing an integrated image, said system comprising means for transforming the contents of a plurality of source data bases, each of them being loaded with legacy data records which are modelled according to a data model specific for that source database, to a target database having its own specific target data model, based upon the corporate data model, and said system comprising an intermediate merge database, including control means, between said source databases and said target database, said merge database having an intermediate data structure, and being filled with data from said source database, while said data are re-grouped and re-structured according to said intermediate data structure; said target database being filled from said merge database with said re-grouped and re-structured data, according to said target data model, said target model being enabled to extract data by said system users via user front-end applications;

said intermediate data structure of said merge database comprising following structure elements;

a source identification (BI) indicating the origin of data records within the source database;

a source reference (BR) indicating the origin of related data items in the source database;

a target object identifier (TI) indicating a target object for each of said data record;

a target object reference (TR) indicating a target object for each of said related data items;

a status identifier (ST) indicating if data is current; and grouping attributes (GA) indicating fields into which data records can be divided in the case of a target object, and relational attributes (RA) indicating fields with which data records are related to a target object-identifier within the merge database;

said transformation, by means of said merge database, comprising following basic operations:

a PROJECTION operation, consisting of filling the table of the merge database from the source database and thereby changing said source identification (BI), said source reference (BR), said status identifier (ST), and said attributes (GA, RA), by said merge database, in conformity to the different data models of the respective databases;

a GROUPING operation, consisting of determining the target object identifier of each data record and thereby changing said target identifier (TI) and reading said status identifier (ST) and said grouping attribute;

a RELATING operation, consisting of determining the target object identifier of each related data item and thereby reading said target object identifier (TI), said status identifier and said relational attribute (RA), while changing sand target object reference (TR); and optionally a CALCULATING operation, consisting of an evaluation of each attribute of a table of the merge database.

* * * * *